April 28, 1953    C. L. SWIFT    2,636,578
SELF-ADJUSTING BRAKE
Filed Sept. 24, 1947
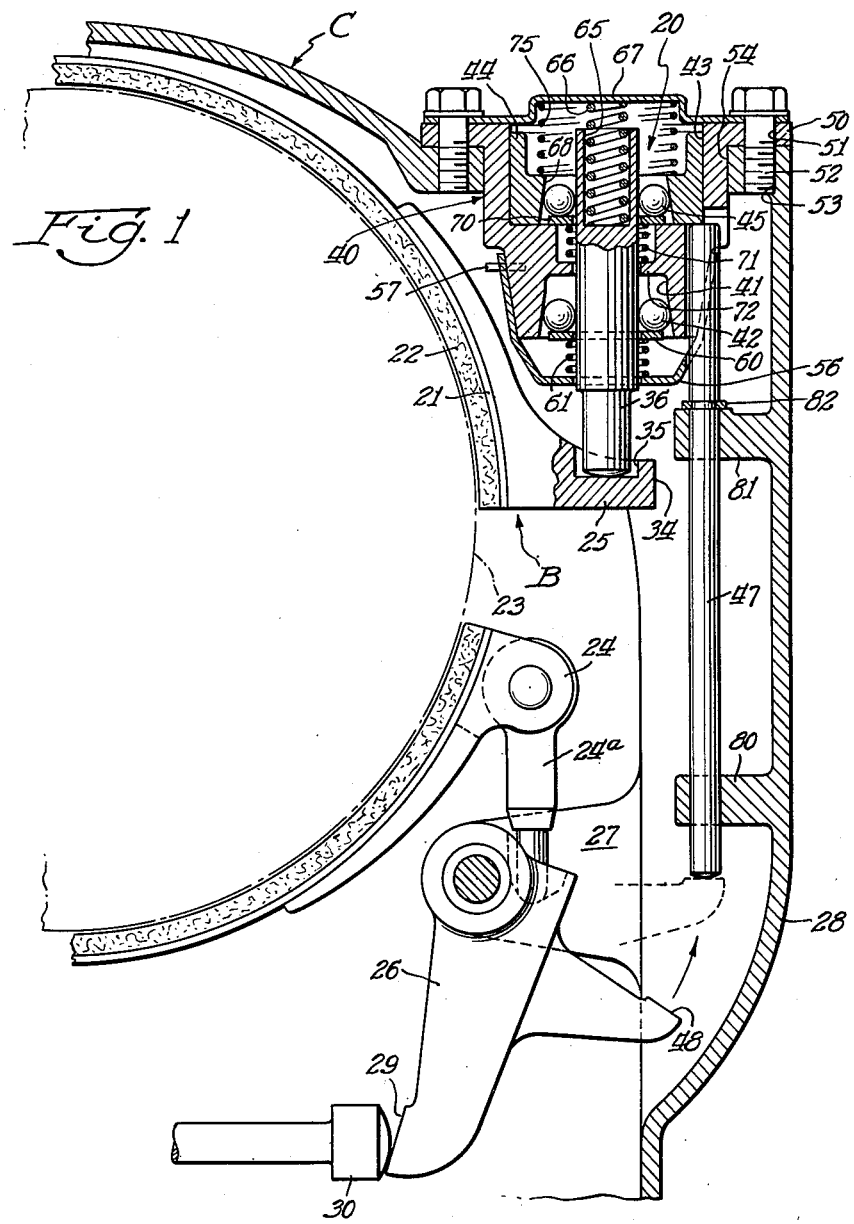
Inventor:
Clifford L. Swift Patented Apr. 28, 1953

2,636,578

UNITED STATES PATENT OFFICE 2,636,578

SELF-ADJUSTING BRAKE

Clifford L. Swift, Muncie, Ind., assignor to Borg-Warner Corporation, Chicago, Ill., a corporation of Illinois Application September 24, 1947, Serial No. 775,814

5 Claims. (Cl. 188—79.5)

This invention relates in general to brake mechanisms and is particularly concerned with such brake mechanisms adaptable to be incorporated, for example, in a transmission for an automotive vehicle and characterized as having means whereby such brake mechanism may be self-adjusting.

Heretofore, brake mechanisms of this general class were provided with two terminals, one of which was held in an adjustable fixed position, and the other of which was operatively connected with a suitable hydraulic means which when operated would cause the brake band to grip an associated brake drum. Because of the normally inaccessible location of the braking mechanism in such transmissions, adjustment to compensate for normal wear was inconvenient.

Accordingly, an object and accomplishment of the invention is to provide a brake mechanism having incorporated therein, an automatic takeup for the brake band, said takeup mechanism being adaptable to automatically compensate for the normal wear of the friction facing of the brake band.

The invention seeks, as a further object and accomplishment to provide an automatic takeup mechanism for brake bands as contemplated herein and characterized by an arrangement of parts to more advantageously and satisfactorily perform the function required of it and adapted to provide a compact unit which will successfully combine the factors of structural simplicity and durability, and yet be economical to manufacture.

Another object and accomplishment of the invention is to improve the construction of brake mechanisms by the incorporation therein of an automatic takeup for brake bands as contemplated herein, thereby to increase the efficiency and versatility of such brake mechanism; and to this end, an important feature of the invention is to provide a brake mechanism comprising in general, a conventional brake band adaptable to be operatively associated with a suitable brake drum, said brake band having a pair of terminals, one of which is provided with an automatic takeup mechanism adaptable to compensate for the normal wear of the friction facing of the brake band and the other terminal being of the conventional type and adaptable to be operatively associated with a suitable operating mechanism such as, for example, a hydraulic piston or the like.

Additional objects, features, and advantages of the invention disclosed herein will be apparent to persons skilled in the art after the construction and operation are understood from the within description.

It is preferred to accomplish the various objects of this invention and to practice the same in substantially the manner hereinafter fully described and as more particularly pointed out in the appended claims, reference being had to the accompanying drawing, which forms a part of this specification, wherein:

The figure is a fragmentary sectional elevational view of a brake mechanism embodying the features of this invention and having portions broken away to more advantageously show the construction thereof.

The drawing is to be understood as being more or less of a schematic character for the purpose of illustrating and disclosing a typical or preferred form of the improvements contemplated herein.

Referring to the drawing, I have illustrated the automatic takeup for the brake band with which the invention is particularly concerned and designated in its entirety by the numeral 20, as being operatively associated with a conventional brake mechanism designated in its entirety by the letter B, said brake mechanism B being adjunctively employed, for example, to a conventional transmission C of a conventional automotive vehicle (not shown).

The conventional brake mechanism may comprise a brake band 21 having secured thereto, by any approved practice, friction facing material 22 adaptable to engage a drum-like formation 23 upon operation of the device.

Suitably secured to the brake band 21 by any approved practice I have provided terminal members 24 and 25. The terminal member 24 may be of conventional construction and comprises, in general, a connector pin 24a pivotally carried by the terminal 24, said connector pin 24a being adaptable to engage portions of a lever member 26 suitably carried for pivotal movement by a bracket member 27 of the transmission housing 28. The lever 26 is provided with a protuberance 29 adaptable to be engaged by a thruster rod 30 of a brake operator mechanism such as, for example, a hydraulic piston (not shown).

The terminal 25 is provided with a flanged portion 34 having a recess 35 adaptable to receive a reaction pin 36 of the automatic takeup mechanism 20.

Suffice it to say, since the invention is not particularly concerned with the precise construction of the illustrated brake mechanism and/or transmission and/or their associated parts, they will not be further described in detail, and it is deemed sufficient for all intentions and purposes herein contained to show only portions thereof adjacent to and cooperating with the automatic takeup mechanism 20 contemplated herein. It is to be understood that details of construction of such brake mechanism and/or transmission and/or their associated parts may be modified to suit particular conditions, and I do not wish to be limited to the construction of these elements as set forth, except where such construction particularly concerns the invention contemplated herein.

Having thus described, by way of example, a possible adaptation of the automatic takeup mechanism as contemplated herein, and having described the general environment surrounding the adaptation, the specific construction and co-operating functions of the parts of said automatic takeup mechanism with which the present invention is particularly concerned, will now be described in detail.

In the exemplary embodiment of the invention depicted in the figure, the automatic takeup 20 for the brake band with which the present invention is particularly concerned comprises in general, a housing 40 suitably secured to the transmission housing 28 and provided with a lower chamber 41 having operatively disposed therein a plurality of balls such as at 42 adaptable to wedgingly engage the reaction pin 36, thereby restricting upward movement of said reaction pin, said housing having at its upper regions a chamber 43 having operatively disposed therein and adaptable for vertical movement therein a clutch member 44 adaptable to retain in operative position a plurality of balls such as at 45 adaptable to wedgingly engage the reaction pin 36 and having an action whereby the reaction pin is normally forced downward into engagement with the terminal 25 of the brake band, and means comprising a rod 47, the lower end portion of which is adaptable to be engaged by a lever member 26 and the upper end portion of said rod 47 being adaptable to engage the clutch member 44, whereby upon action of the lever member 26, the lever element 48 will engage the rod 47 and move the same upwardly, thereby causing upward movement of the clutch member 44.

It is contemplated that in normal operation the lever 26 will not move far enough for the lever element 48 to contact the rod 47. The normal clamping position of the lever will lie somewhere between the full line and the dotted line positions shown on the drawing. It is only when the brake band is worn down to a certain extent that the lever and rod will contact, and the adjusting action will come into play.

The housing 40 is formed to define a flanged portion 50 having suitable through apertures 51 adaptable to receive a suitable cap-bolt 52 which in turn is received into suitably threaded apertures 53 in the transmission housing 28, thereby fixedly securing the housing 40 to the transmission housing 28. It is notable that the entire automatic takeup assembly 20 may be advantageously removed or inserted through the aperture 54 in the transmission housing. In order to remove the same, it is only necessary to remove the cap-bolts 52 and the automatic takeup assembly 20 may then be advantageously and conveniently lifted upwardly and outwardly of the transmission housing 28. Preferably, the housing 40 is provided with a cap 56 adaptable to close the lower portions of the housing 40, said cap being removably secured in position by means of a suitable snap-ring 57. The cap 56 is provided with a suitable aperture adaptable to receive and permit the reaction pin 36 to move inwardly and outwardly of the housing 40 during operation of the device.

The chamber 41 is formed to define side walls tapering outwardly of the housing so that when the reaction pin 36 is caused to move upwardly during the operation of the device, the balls 42 will be forced upwardly and thereafter will wedgingly engage the reaction pin 36, thereby restricting further upward movement of said reaction pin.

In order to retain the balls in operative position in the chamber 41, I have provided a washer 60 in engagement with lower portions of the balls 42 and a suitable compression spring 61 having end portions in engagement with the cap 56 and the washer 60 thereby holding the washer in engagement with the balls 42. With this construction it may be seen that a minimum amount of upward movement of the reaction pin 36 will cause the balls 42 to lock.

The reaction pin 36 at its upper end is provided with a recess 65 adaptable to receive a compression spring 66 of suitable strength and thickness and having end portions in engagement with a cover plate 67 and the other end portions being in engagement with the reaction pin 36, thereby normally urging movement of the reaction pin in a downward direction into the recess 35 of the terminal 25.

The clutch member 44 is formed to define tapered walls 68 adaptable to cause the balls 45 retained therein to wedgingly engage the reaction pin 36 thereby tending to force the reaction pin 36 in a downward direction which will take up and compensate for any normal wear of the friction facings 22 of the brake band 21. It is notable that the balls 45 are retained in their operative position by means of a washer 70 normally in engagement with lower portions of the balls 45 and having compression spring 71 of suitable strength and thickness and having end portions in engagement with a flange 72 of the housing 40 and the other end portions being in egagement with the washer 70, thereby tending to force the washer upwardly, whereby the balls will be held in operative position.

It is notable that the clutch member 44 is disposed within the chamber 43 in a manner so as to permit vertical movement of the clutch member 44 during operation of the device and, in order that the clutch member 44 may be returned to its original position, I have provided a compression spring 75 of suitable strength and thickness and having end portions in engagement with the cover 67 and the other end portions being in engagement with the clutch member 44, thereby to normally force the clutch member 44 in a downward direction.

According to the construction of the present invention, the rod 47 is shown in engagement with the clutch member 44, the rod 47 being adaptable to move in an upward direction and is held in position by suitable guides 80 and 81 which may be integrally formed with the transmission housing 28. In order to restrict the downward movement of the rod 47, I have provided a washer 82 which is adaptable to engage portions of the guide 81 as shown during the downward movement of the rod 47.

Adverting to the drawing it can be seen that the rod 47 is caused to move upwardly by means of the lever 26; however, it is contemplated that in normal operation the lever 26 will not move far enough for the lever element 48 to contact the rod 47. It is notable that the normal clamping position of this lever will lie somewhere between the full line and the dotted line positions shown on the drawing. It is only when the brake band is worn down to a certain extent that the lever and rod will contact, and the adjusting action will come into play. Accordingly, when the braking mechanism is actuated and the brake band is sufficiently worn, portions of the lever 26, namely, the lever element 48 will move into the position shown in the dotted lines, thereby causing the rod to move upwardly and, since the rod 47 is normally in engagement with portions of the clutch member 44, the clutch member will be forced upwardly thereby causing the release of the wedge-like grip of the balls 45 on the reaction pin 36. Accordingly, it can be seen that when the brake operating lever 26 moves to the extreme position shown by the dotted lines, it contacts the vertical rod 47, which in turn raises slightly the clutch member 44. This action enables the ball clutch comprising the balls 45 to become operative when the brake is subsequently released and such reaction of the balls 45 pushes the reaction pin 36 downwardly a slight amount to a new position, such downward movement of the reaction pin automatically compensates for any brake band wear.

According to the construction of the present invention, the lower ball clutch comprising the balls 42 has the function of receiving the brake band reaction during operation of the brake mechanism and restricting the upward movement of the reaction pin 36, while the upper ball clutch comprising the balls 45 has the primary function of causing the reaction pin to move slightly in a downward direction, when necessary, to compensate for normal wear of the friction facings of the brake band 21.

The operation of the device may be as follows: In order to cause the brake mechanism to operate the thruster rod 30 of a brake operator mechanism such as, for example, a hydraulic piston (not shown) is caused to engage the lever 26 which will actuate the braking mechanism. When the brake band 21 is in engagement with the drum 23, the normal reaction of the terminal 25 is transmitted to the reaction pin 36. It is notable that the reaction pin 36 must be held in a relatively fixed position in order to receive the reaction of the terminal 25. In order to hold the reaction pin in a relatively fixed position and yet provide for the automatic adjustment of said reaction pin 36, I have provided the ball clutch comprising balls 42 which, by reason of the tapered walls of the chamber 41, will wedgingly engage the reaction pin 36, thereby restricting the upward movement of the reaction pin 36 and transmitting the reaction to the housing 40 and thereafter to the transmission housing 28.

In referring to the drawing it can be seen that when the lever 26 is moved during operation of the braking mechanism, the lever element 48 will move into the dotted line position as shown in the event the brake bands are worn and engage lower end portions of the rod 47 and, since the upper end portions of the rod 47 are normally in engagement with the clutch member 44, the rod 47 will cause said clutch member 44 to move slightly upwardly, thereby releasing the wedging grip of the ball clutch comprising balls 45 on the reaction pin 36. When the brake is subsequently released, the lever 26 will assume its full line position as shown and the rod 47 will be lowered by gravity until the washer 82 will become engaged with the guide 81 as shown, thereby permitting the clutch member 44 to be moved downwardly by virtue of the action of the compression spring 75. It may be seen that this downward movement of the clutch element 44 will cause the balls 45 to wedgingly engage the reaction pin 36 and cause said reaction pin 36 to move downwardly slightly with the clutch member 44. It is notable that such downward movement of the reaction pin automatically compensates for any brake band wear by reason of the fact that the reaction pin 36 will always be moved to a new position into proper engagement with the terminal 25.

Thus it can be seen that the lower ball clutch comprising the balls 42 has the primary function of receiving the brake band reaction during operation of the brake mechanism and restricting the upward movement of the reaction pin 36, while the upper ball clutch comprising the balls 45 has the primary function of causing the reaction pin to move slightly in a downward direction, when necessary, to compensate for normal wear of the friction facings of the brake band 21.

From the foregoing disclosure it may be observed that I have provided an automatic takeup for brake bands which efficiently fulfills the objects thereof as hereinbefore set forth which provides numerous advantages which may be summarized as follows:

1. Structurally simple, efficient and durable;
2. Economical to manufacture and readily adaptable to mass production manufacturing principles; and
3. The provision of a brake mechanism having incorporated therein, an automatic takeup for the brake band, said takeup mechanism being adaptable to automatically compensate for the normal wear of the friction facings of the brake band.

While I have illustrated a preferred embodiment of my invention, many modifications may be made without departing from the spirit of the invention, and I do not wish to be limited to the precise details and construction set forth, but wish to avail myself of all changes within the scope of the appended claims.

I claim:

1. In a brake, the combination of a circular brake drum, a brake band substantially encircling said drum and having a reaction terminal and a movable band applying terminal, an operator for moving said movable band applying terminal in a direction substantailly tangent to said drum to engage the band on the drum, means for taking a reaction of said reaction terminal when the movable terminal is moved to engage the brake and including a pin extending substantially in said above direction, a one-way brake for preventing movement of the pin due to reaction on said reaction terminal, a one-way clutch including a part movable in said direction and functioning to engage and move said pin towards said movable terminal, and means connecting said operator and said one-way clutch and including a shaft extending substantially in said direction between said operator and clutch for causing the clutch to move said pin and take up any slack in said band when said operator moves more than a predetermined amount.

2. In a brake, the combination of a circular drum, a brake band substantially encircling said drum, said brake band having a reaction terminal and a movable band applying terminal, an operator for moving said band applying terminal in a direction substantially tangent to said drum to engage the band on the drum, means for taking up any slack in said band when said operator moves more than a predetermined amount including a member extending substantially in said direction, a one-way clutch, a shaft extending substantially in said direction between said operator and said clutch, said shaft actuating said one-way clutch upon operation of said operator whereby said member is moved by said one-way clutch an amount commensurate with said slack in said band and the slack is thereby taken up, and means acting on said member for taking a reaction of said reaction terminal when said band applying terminal is moved to engage the band on the drum.

3. In a brake, the combination of a brake band adapted to engage a drum, said brake band being provided with two terminals a first one of which is adapted to be held relatively stationary and the second of which is adapted to be moved to engage the drum, a brake operator for moving said movable terminal to apply the brake, a reaction member in engagement with said first terminal, a one-way engaging mechanism for preventing movement of said reaction member in one direction and taking the reaction from said band when the movable terminal is moved to engage the brake, means including a second one-way engaging mechanism rendered effective by said brake operator on an excessive movement of the brake operator for moving said reaction member to take up slack in the brake band, and means for applying a substantially constant force to said reaction member tending to retain said reaction member in constant engagement with said first terminal.

4. In a brake, the combination of a drum, a brake band adapted to engage said drum, a relatively stationary terminal on said band, a movable terminal on said band, an operator for moving said movable terminal to cause said band to engage said drum, a reaction pin for engaging said first-mentioned terminal, a one-way ball brake for preventing movement of said reaction pin in one direction and taking the reaction from said band upon engagement of said band with said drum, a one-way ball clutch actuated by said operator upon excessive movement thereof and having means associated therewith for moving said reaction pin to take up slack in the brake band upon subsequent release of the operator, and a spring for applying a constant force against said reaction pin to continuously retain the reaction pin engaged with said first-mentioned terminal.

5. In a brake, the combination of a drum, a brake band adapted to engage said drum, a relatively stationary terminal on said band, a movable terminal on said band, a pivotally mounted lever for moving said movable terminal to cause said band to engage said drum, a pin for engaging said first-mentioned terminal, a one-way engaging means cooperating with said pin for preventing movement of the pin in one direction and taking a reaction from said band upon engagement of said band with said drum, a second one-way engaging means actuated by said pivotally mounted lever upon excessive movement thereof and having means associated therewith for moving said pin to take up slack in the brake band upon subsequent release of the lever, and a spring for applying a substantially constant force against said pin to continuously retain the pin engaged with said first-mentioned terminal.

CLIFFORD L. SWIFT.

References Cited in the file of this patent

UNITED STATES PATENTS

| Number | Name | Date |
|---|---|---|
| 1,114,295 | Sauvage | Oct. 20, 1914 |
| 1,734,935 | Zaccone | Nov. 5, 1929 |
| 1,792,873 | Sauvage | Feb. 17, 1931 |
| 2,052,054 | Patterson | Aug. 25, 1936 |
| 2,204,872 | Thompson | June 18, 1940 |
| 2,237,095 | Casner | Apr. 1, 1941 |
| 2,423,575 | Beezley | July 8, 1947 |

FOREIGN PATENTS

| Number | Country | Date |
|---|---|---|
| 716,416 | France | Dec. 21, 1931 |
| 360,257 | Italy | June 15, 1938 |